United States Patent
Wang

(10) Patent No.: US 9,110,713 B2
(45) Date of Patent: Aug. 18, 2015

(54) MICROARCHITECTURE FOR FLOATING POINT FUSED MULTIPLY-ADD WITH EXPONENT SCALING

(75) Inventor: Liang-Kai Wang, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 13/598,760

(22) Filed: Aug. 30, 2012

(65) Prior Publication Data
US 2014/0067895 A1  Mar. 6, 2014

(51) Int. Cl.
G06F 7/483    (2006.01)
G06F 7/544    (2006.01)

(52) U.S. Cl.
CPC .............. *G06F 7/483* (2013.01); *G06F 7/5443* (2013.01)

(58) Field of Classification Search
None
See application file for complete search history.

(56) References Cited

U.S. PATENT DOCUMENTS

| | | | |
|---|---|---|---|
| 5,757,687 A | 5/1998 | Naffziger et al. | |
| 7,451,172 B2 | 11/2008 | Powell, Jr. et al. | |
| 7,689,642 B1 | 3/2010 | Rarick | |
| 7,698,353 B2 | 4/2010 | Tan et al. | |
| 7,899,859 B2 | 3/2011 | Lyu et al. | |
| 7,962,543 B2 | 6/2011 | Schulte et al. | |
| 8,106,914 B2 | 1/2012 | Oberman et al. | |
| 2001/0002484 A1* | 5/2001 | Yung | 712/221 |
| 2004/0122886 A1 | 6/2004 | Gerwig et al. | |
| 2006/0149803 A1* | 7/2006 | Siu et al. | 708/501 |
| 2009/0292754 A1 | 11/2009 | Cornea-Hasegan | |
| 2011/0107069 A1 | 5/2011 | Hansen et al. | |
| 2011/0231460 A1 | 9/2011 | Ahmed | |
| 2012/0059866 A1 | 3/2012 | Conyngham et al. | |
| 2014/0067894 A1* | 3/2014 | Plondke et al. | 708/501 |
| 2014/0067895 A1* | 3/2014 | Wang | 708/501 |

OTHER PUBLICATIONS

Hokenek, et al., "Second-Generation RISC Floating Point with Multiply-Add Fused," IEEE Journal of Solid-State Circuits, vol. 25, No. 5, Oct. 1990, pp. 1207-1213.

Lang, et al., "Floating-Point Multiply-Add-Fused with Reduced Latency," IEEE Transactions on Computers, vol. 53, No. 8, Aug. 2004, pp. 988-1003.

Nievergelt, Y., "Scalar fused multiply-add instructions produce floating-point matrix arithmetic provably accurate to the penultimate digit," ACM Transactions on Mathematical Software, vol. 29, No. 1, Mar. 2003, pp. 27-48.

Quinnell, et al., "Bridge Floating-Point Fused Multiply-Add Design," IEEE Transactions on Very Large Scale Integration (VLSI) Systems, vol. 16, No. 12, Dec. 2008, pp. 1726-1730.

(Continued)

Primary Examiner — David H Malzahn
(74) Attorney, Agent, or Firm — Peter Michael Kamarchik; Nicholas J. Pauley; Joseph Agusta

(57) ABSTRACT

Systems and methods for implementing a floating point fused multiply and accumulate with scaling (FMASc) operation. A floating point unit receives input multiplier, multiplicand, addend, and scaling factor operands. A multiplier block is configured to multiply mantissas of the multiplier and multiplicand to generate an intermediate product. Alignment logic is configured to pre-align the addend with the intermediate product based on the scaling factor and exponents of the addend, multiplier, and multiplicand, and accumulation logic is configured to add or subtract a mantissa of the pre-aligned addend with the intermediate product to obtain a result of the floating point unit. Normalization and rounding are performed on the result, avoiding rounding during intermediate stages.

29 Claims, 10 Drawing Sheets

(56) References Cited

OTHER PUBLICATIONS

Seidel, et al., "Multiple Path IEEE Floating-Point Fused Multiply-Add," 2003 IEEE 46th.

International Search Report and Written Opinion—PCT/US2012/062626—ISA/EPO—Jun. 28, 2013.

Cornea-Hasegan et al.,"Correctness proofs outline for Newton-Raphson based floating-point divide and square root algorithms", Computer Arithmetic, Proceedings. 14th IEEE Symposium on, vol., No., pp. 96-105 (1999).

Intel, "Division, Square Root and Remainder Algorithms for the Intel Itanium architecture", Application Note, Intel Itanium Processors, 120 pgs. (Nov. 2003).

Intel, "Intel Itanium Architecture Software Developer's Manual", vol. 1: Application Architecture, Revision 2.2, pp. 250 (Jan. 2006).

Intel, "Intel itanium Architecture Software Developer's Manual", vol. 3: Instruction Set Reference, Revision 2.2, pp. 986 (Jan. 2006).

Intel, "Itanium Processor Floating-point Software Assistance and Floating-point Exception Handling", pp. 106 (Jan. 2000).

Harrison J., "A Machine-Checked Theory of Floating Point Arithmetic" In: "Theorem Proving in Higher Order Logics", Jan. 1, 1999, Springer Berlin Heidelberg, Berlin, Heidelberg, XP055089130, and ISBN: 978-3-54-066463-5 vol. 1690, pp. 113-130, DOI: 10.1007/3-540-48256-3_9.

"IEEE Standard for Floating-Point Arithmetic; IEEE Std 754-2008 ED—Anonymous", IEEE Standard; [IEEE Standard], IEEE, Piscataway, NJ, USA, Aug. 29, 2008, pp. 1-58, XP017604142, ISBN: 978-0-7381-5752-8.

Markstein P.W., "Computation of Elementary Functions on the IBM RISC System/6000 Processor", IBM Journal of Research and Development, International Business Machines Corporation, New York, NY, US, vol. 34, No. 1, Jan. 1, 1990, pp. 111-119, XP000128187, ISSN: 0018-8646.

Muller J-M., et al., "Handbook of Floating-Point Arithmetic—Chapter 5" In: "Handbook of Floating-Point Arithmetic—Chapter 5", Jan. 1, 2010, Birkhauser, Boston, XP055089174, ISBN: 978-0-81-764704-9, pp. 151-179, DOI: 10.1007/978-0-8176-4705-6.

* cited by examiner

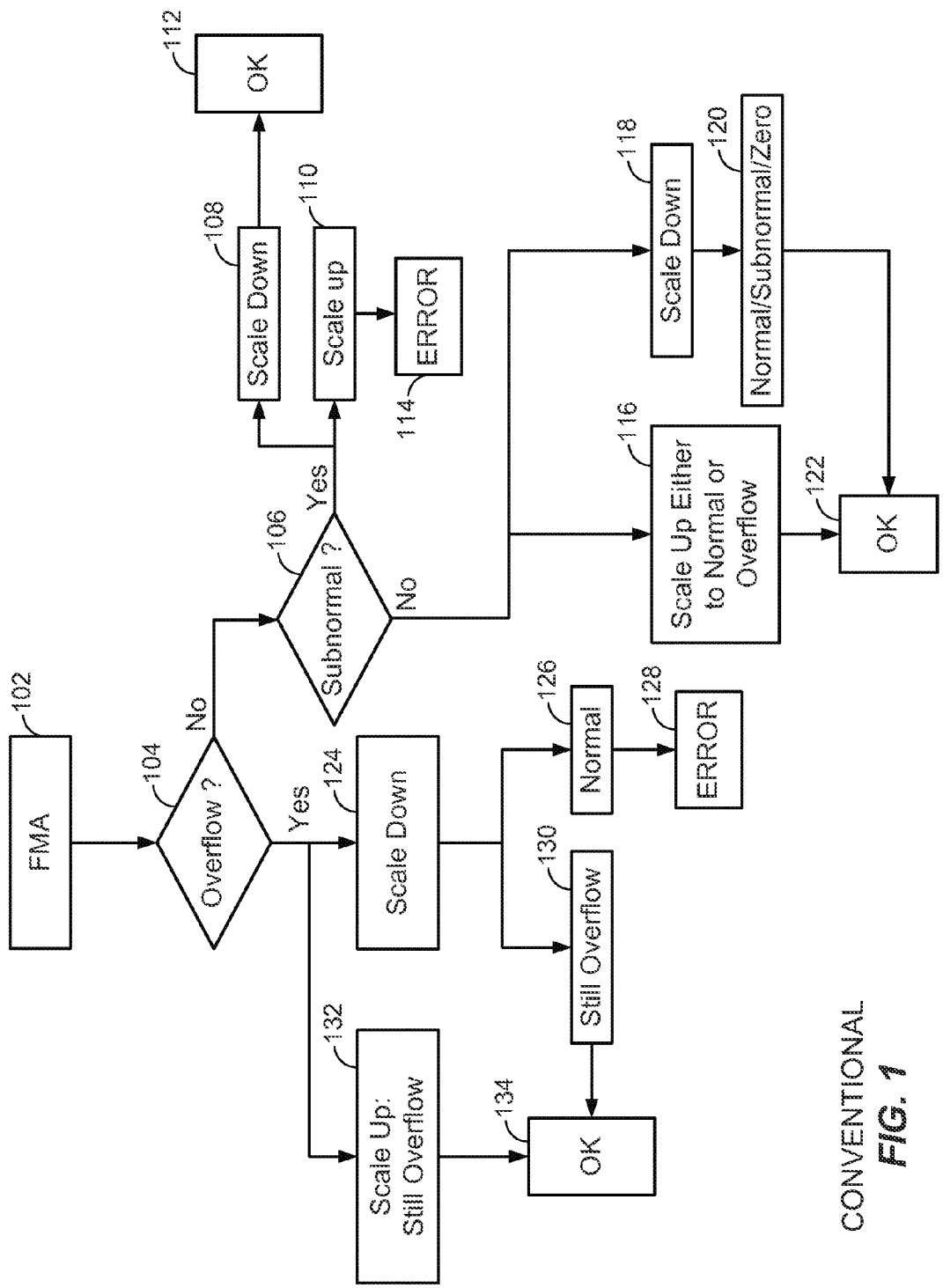
CONVENTIONAL
FIG. 1

| Case Description | Operation on Incrementer Part | Operation on Add Part | |
|---|---|---|---|
| $Ex - Em > 3$, $Rm \pm Rx$ | Compute HMx and HMx +1 and select using carry-over from add | Shift by Ex-Em to normalize | 302 |
| $Ex - Em = 3$, $Rm + Rx$ | Compute HMx and HMx +1 and select using carry-over from add | Shift by Ex-Em to normalize | 304 |
| $Ex - Em < 3$, $Rm \pm Rx$ | HMx = 0 | Shift amount for Mm $\pm$ LMx derived from LZA | 306 |
| $Ex - Em < 3$, max (Ex, Em) ≤ 47 $Rm - Rx$ | HMx = 0 | Cap shift amount at max(Ex, Em) − 1 | 306a |
| $Ex - Em \leq 24$, one of Rs/Rt is subnormal | HMx = 0 | Colossal cancellation possible, use guard bit. Cap shift amount at max(Ex, Em) − 1 | 306b |
| $Ex - Em = 3$, $Rm - Rx$ | HMx = 0 | Shift amount for Mm $\pm$ LMx derived from LZA | 308 |

*FMA WITH NO SCALING FACTOR*

*TABLE 1*

*FIG. 3*

| Case Description | Operation on Incrementer Part | Gap | Operation on Add Part |
|---|---|---|---|
| N>0 Rx is normal | Same as FMA | N/A | Same as FMA |
| N>0 Rx is subnormal | Left Shift by min(LZC(Rx), N) | N/A | Right shift by Ex-Em-min(LZC(Rx), N) = (1-Em)-LZC(Rx) or 1-(Em+N)* |
| Ex+N<=0 Rm-Rx | Right shift by - (Ex+N)+1 | Record guard and round bits due to right shift | Right shift to flush, only contribute to sticky bit |

FMASc with scaling factor N; Ex − Em > 26

TABLE 2
FIG. 4

| Case Description | Incrementer Part | Product Part | Note* |
| --- | --- | --- | --- |
| N>0<br>Rx is normal | Same as FMA | Same as FMA | |
| N>0<br>Rx is subnormal<br>Rm+Rx<br>Ex-Em-min(LZC(Rx),N)>3 or =3 and ADD: | Left Shift by min(LZC(Rx), N) | Right shift by Ex-Em-min(LZC(Rx), N)= (1-Em)-LZC(Rx) or 1-(Em+N) | 1-Em-N>=3 based on the case requirement HMx is not zero |
| N>0<br>Rx is subnormal<br>Ex-Em-min(LZC(Rx),N)<3 or =3 and SUB: | HMx = 0 | Left shift and capped by -(Em+N) | HMx is zero. Em+N>-2 |
| N<0<br>Rm+Rx | Right shift by -(Ex+N)+1 | Right shift by 1-(Em+N) Record guard, sticky bits | |

*TABLE 3*
*FIG. 5*

FMASc with scaling factor N; Ex − Em = 26~4 or 3

| Case Description | Incrementer Part | Add Part |
|---|---|---|
| N > 0 | Same as FMA | Same as FMA |
| N < 0 | No shift | If Em > Ex or<br>If Em>=Ex and Em+N<-1:<br>right shift by 1-(Em+N) |
| | No shift | Em>=Ex and Em+N=0, -1<br>left shift and capped with (Em+N) |

*FMASc with scaling factor N; (Ex – Em <3) or (Ex – Em = 3 and operation relates to Rm – Rx)*

*TABLE 4*
*FIG. 6*

MICROARCHITECTURE FOR FLOATING POINT FUSED MULTIPLY-ADD WITH EXPONENT SCALING

REFERENCE TO CO-PENDING APPLICATIONS FOR PATENT

The present Application for Patent is related to the U.S. patent application Ser. No. 13/598,718 entitled "OPERATIONS FOR EFFICIENT FLOATING POINT COMPUTATIONS" by Erich Plondke, filed on Aug. 30, 2012, assigned to the assignee hereof, and expressly incorporated by reference herein.

FIELD OF DISCLOSURE

Disclosed embodiments are directed to handling corner cases in floating point arithmetic. More particularly, exemplary embodiments are directed to hardware support for specialized instructions and designed for handling problematic corner cases in floating point operations such as division and square root computations

BACKGROUND

Floating point numbers are capable of representing a much larger dynamic range of values than fixed point numbers. Accordingly, floating point arithmetic has found use in modern processors. The IEEE 754 standard provides a standardized format for representing binary floating point numbers. Implementations of floating point arithmetic in conformance with the standard involve certain recognized exceptional and problematic corner cases. Conventionally software traps are implemented to handle these corner cases. However, handling exceptions and implementing traps in software consuming and taxing on processor resources.

In the case of division using the Newton-Raphson approach, such problematic cases include underflows, wherein the final quotient value is too small to be represented in the IEEE 754 standard using the assigned number of bits; overflows, wherein the final quotient value is too large to be represented in the IEEE 754 standard using the assigned number of bits; insufficient precision due to situations like underflows and overflows of intermediate results; and significand values which do not lend themselves well to reciprocal refinement. Other problematic cases involve division by zero, operand values (numerator/denominator) that are infinity or not-a-number (NaN), etc. Problems of a similar nature arise in square root computations as well.

The above-referenced co-pending application describes techniques for efficiently handling such problematic corner cases. As described therein, floating point numbers which may generate exceptional conditions and problematic corner cases are recognized early on and specialized instructions are defined for fixing up the computations performed on such floating point numbers. By fixing up the computations in this manner, the floating point operations are guaranteed to generate results which are free of problems. For example by applying these fixes to computations using floating point numbers which are recognized to be present in a region of the number space that will give rise to one or more of the above problematic cases, the computations can be guaranteed to be problem-free. One common computation in Newton-Raphson floating point division/square root is a multiply—accumulate (MAC) or fused multiply-accumulate (FMA) computation, wherein an addend operand is added to/subtracted from the product of a multiplier and multiplicand operands. A specialized instruction defined as a fused multiply-accumulate with scaling (or "FMASc") is defined in the co-pending application for fixing up FMA computations which may result in overflows/underflows, etc. Essentially, the FMASc instruction can be mathematically represented as $[(Rs*Rt) \pm Rx]*2^N$ where Rs, Rt, and Rx are floating point numbers on which the FMA is performed and N can be a positive or negative fixed point number forming the scaling factor.

Implementing the FMASc instruction in hardware using a conventional floating point processor would entail first performing the FMA computation and then applying the scaling factor to it. However, as already described, the FMA itself may overflow/underflow or result in a subnormal result, and therefore, staging the FMA and scaling operations as such may not achieve the objective of handling the problematic corner cases. Even if the FMA itself does not overflow or underflow, the subsequent scaling in a staged implementation may lead to undesired results.

Some of the drawbacks associated with staging the FMA and scaling operations are illustrated in FIG. 1. As shown, the FIVIA operation is computed at block 102. The result is checked for overflow in block 104. If an overflow occurs, and the scaling factor is for scaling up (e.g. N is positive), and the final result still overflows at block 132, then the scaling would not have introduced an overflow. However, the overflow will still need to be handled. Similarly, if an overflow occurs, and if the scaling factor is for scaling down (e.g. N is negative) at block 124, and the final result still overflows at block 130, then the scaling does not introduce additional problems, as shown by block 134. However, if the final result after scaling down is normal (block 126), then there was a loss of bits, and the final result is not accurate (block 128).

On the other hand, if there was no overflow in block 104, and the result of the FMA was subnormal (i.e. cannot be represented in the standard IEEE 754 notation) in block 106, then scaling down in block 108 may not be problematic (block 112), while scaling up in block 110 will cause loss of bits and accuracy (block 114). If the result of the FMA is not subnormal in block 106, and upon scaling down in block 118, the final result was normal or subnormal or zero in block 120, then there are no additional problems introduced in block 122. Similarly, if the result of the FMA is not subnormal in block 106, and scaling up causes the final result to overflow or be normal block 116, then no additional problems are introduced in block 122 either.

To summarize, it can be seen that there are at least the two conditions in blocks 111 and 128 wherein the scaling factor may itself introduce additional problems, when the FMASc instruction is executed conventionally as a sequentially staged FMA operation followed by scaling.

Accordingly, there is a need in the art for hardware configured to avoid the aforementioned and additional drawbacks associated with implementing the FMASc instruction.

SUMMARY

Exemplary embodiments of the invention are directed to systems and methods for implementing floating point fused multiply and add with scaling (FMASc) operations.

Accordingly, an exemplary embodiment is directed to a method of implementing a floating point scaled fused multiply and accumulate (FMASc) operation, the method comprising: multiplying mantissas of a floating point multiplier operand and with a floating point multiplicand operand to obtain a mantissa of a product, determining a count of the number of leading zeros (LZC) of the mantissa of a floating point addend operand. The method further comprising: determining a pre-alignment shift value for the floating point addend operand based on the LZC, a scaling factor operand, and exponents of the floating point addend operand, the floating point multiplier operand, and the floating point multiplicand operand. The method further comprising: shifting the mantissa of the floating point addend operand with the pre-alignment shift value to obtain a pre-aligned addend, accumulating the mantissa of the product and the pre-aligned addend to obtain an intermediate result, determining the number of leading zeros of the intermediate result, determining a normalizing shift value based on the pre-alignment shift value and the number of leading zeros of the intermediate result, and normalizing the intermediate result based on the normalizing shift value to obtain a normalized output of the FMASc operation.

Another exemplary embodiment is directed to a method of executing a floating point operation comprising: receiving multiplier, multiplicand, addend, and scaling factor operands. The method further comprising performing a partial multiplication operation on mantissas of the multiplier and multiplicand operand to obtain an intermediate product, pre-aligning a mantissa of the addend with the intermediate product based on the scaling factor and exponents of the addend, multiplier, and multiplicand, and accumulating the mantissa of the pre-aligned addend and the intermediate product to obtain the result of the floating point operation.

Another exemplary embodiment is directed to a floating point unit comprising input multiplier, multiplicand, addend, and scaling factor operands. The floating point unit further comprising a multiplier block configured to multiply mantissas of the multiplier and multiplicand to generate an intermediate product, alignment logic configured to pre-align the addend with the intermediate product based on the scaling factor and exponents of the addend, multiplier, and multiplicand, and accumulation logic configured to add or subtract a mantissa of the pre-aligned addend with the intermediate product to obtain a result of the floating point unit.

Another exemplary embodiment is directed to a processing system comprising: means for receiving floating point multiplier, multiplicand, addend, and scaling factor operands. The processing system further comprising multiplier means for multiplying mantissas of the multiplier and multiplicand to generate an intermediate product, alignment means for pre-aligning the addend with the intermediate product based on the scaling factor and exponents of the addend, multiplier, and multiplicand, and accumulation means for adding or subtracting a mantissa of the pre-aligned addend with the intermediate product to obtain a floating point result of the processing system.

Yet another exemplary embodiment is directed to a non-transitory computer-readable storage medium comprising code, which, when executed by a processor, causes the processor to perform operations for executing a floating point operation, the non-transitory computer-readable storage medium comprising code for receiving multiplier, multiplicand, addend, and scaling factor operands, code for performing a partial multiplication operation on mantissas of the multiplier and multiplicand operand to obtain an intermediate product, code for pre-aligning a mantissa of the addend with the intermediate product based on the scaling factor and exponents of the addend, multiplier, and multiplicand, and code for adding or subtracting the mantissa of the pre-aligned addend and the intermediate product to obtain the result of the floating point operation.

Another exemplary embodiment is directed to a method of performing a dual data path floating point fused multiply and accumulate operation with scaling (FMASc) operation, the method comprising receiving multiplier, multiplicand, addend, and scaling factor operands. The method further comprising: performing a partial multiplication operation on mantissas of the multiplier and multiplicand operand to obtain an intermediate product, separating the mantissa of the addend into a high addend part with more significant bits and a low addend part with less significant bits, aligning the high addend part to form an incrementer part, aligning the low addend part with the intermediate product, accumulating the low addend part with the intermediate product to form an add part, incrementing or decrementing the incrementer part based on a early out or borrow value respectively from the add part to form a final incrementer part, and concatenating the final incrementer part with the add part to form the result of the floating point operation.

BRIEF DESCRIPTION OF THE DRAWINGS

The accompanying drawings are presented to aid in the description of embodiments of the invention and are provided solely for illustration of the embodiments and not limitation thereof.

FIG. 1 illustrates drawbacks of implementing a scaled FMA operation using conventional floating point hardware.

FIG. 3 illustrates a table of cases corresponding to exemplary dual data path FMA operations.

FIG. 4 illustrates a table cases corresponding to a first set of conditions for determining alignment and normalization of operands in exemplary FMASc implementations.

FIG. 5 illustrates a table of cases corresponding to a second set of conditions for determining alignment and normalization of operands in exemplary FMASc implementations.

FIG. 6 illustrates a table of cases corresponding to a third set of conditions for determining alignment and normalization of operands in exemplary FMASc implementations.

DETAILED DESCRIPTION

Figure 2:
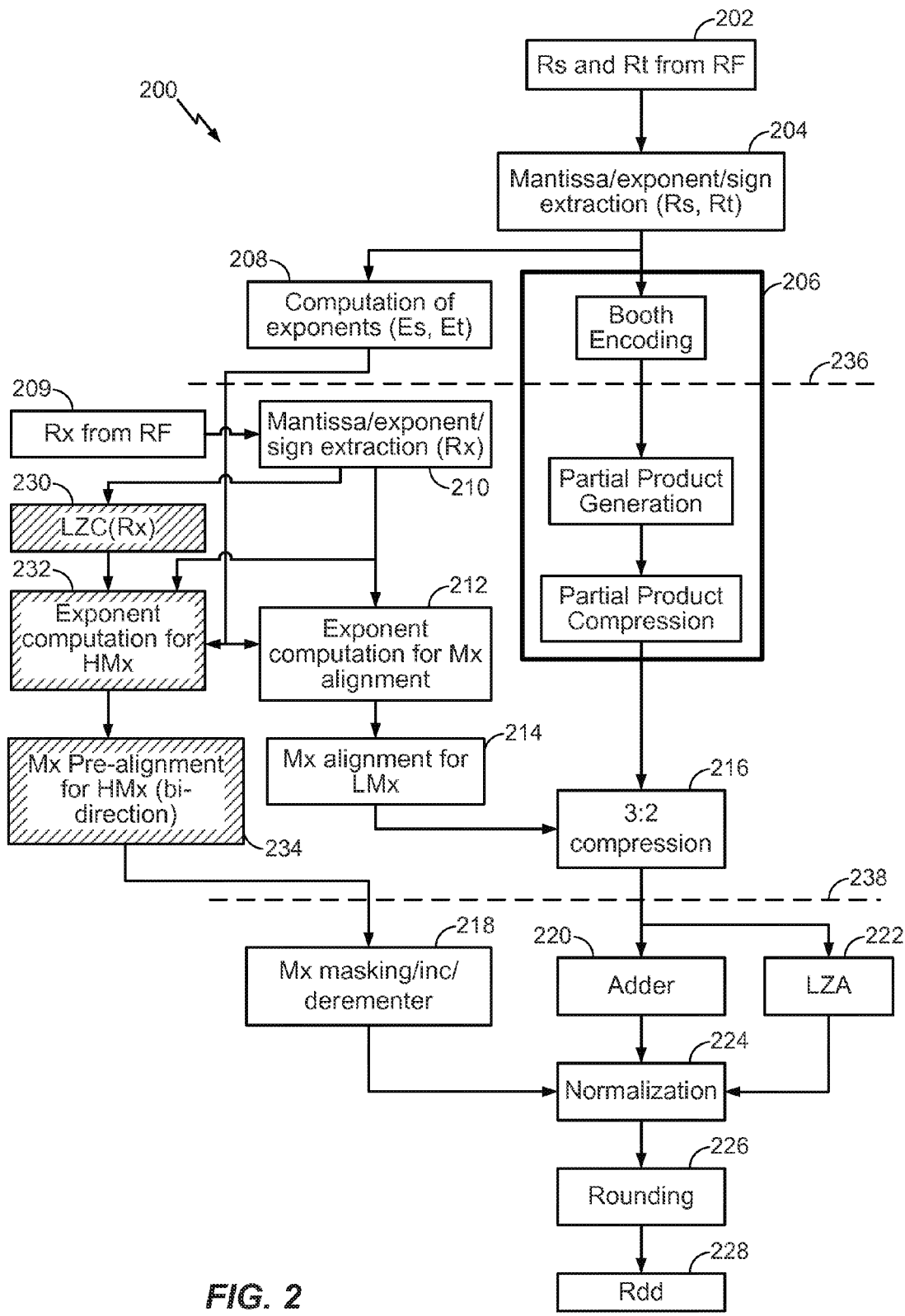
FIG. 2 illustrates floating point unit 200 configured to implement FMASc instructions according to exemplary embodiments.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments relate to hardware support for specialized floating point instructions such as a fused-multiply and add with scaling (denoted as "FMASc" hereinafter). The floating point numbers may be represented in IEEE 754 format. The description herein will focus on single precision or 32-bit floating point operations. Skilled persons will be able to extend the disclosed techniques to double precision (64-bit) as well as 128-bit floating point operations without departing from the scope of the disclosed embodiments. While computational details of floating point arithmetic are provided where necessary to describe exemplary embodiments, it will be understood that an in-depth explanation of floating point arithmetic will not be undertaken here, for the sake of brevity. Skilled persons will appreciate the various aspects of disclosed embodiments related to efficient implementations of the FMASc instruction.

Accordingly, some embodiments are directed to performing both the FMA and the scaling operations of the FMASc instruction in parallel, as an integrated operation, as opposed to conventional implementations which may be restricted to implementing these operations in sequential stages. In this manner, embodiments may be configured to avoid erroneous results based on loss of bits as shown in blocks 114 and 128 of FIG. 1. Embodiments may also defer rounding operations till the final result of the FMASc instruction are computed, thereby avoiding any loss of precision which may be caused due to rounding intermediate results. It will be appreciated that conventional implementations may not be able to similarly defer rounding till the final stage because limited sizes of intermediate storage registers may impose rounding after each sequential stage comprising the FMA and the scaling operations.

By way of background, a conventional representation of floating point numbers according to the IEEE 754 standard will now be briefly explained. According to the latest revision to the standard, a binary floating-point number may be represented by the mathematical expression: $(-1)^s*m*2^e$, wherein s is a sign bit, e is an unbiased exponent, and no is a mantissa or significand. In IEEE 754-2008 single-precision corresponds to 32 bits divided between the sign bit, exponent, and mantissa. The exponent is 8 bits wide with a bias value of 127, such that the range is −126 to 127. The mantissa is 24 bits of which only 23 bits are stored explicitly, while the most significant bit is assumed to be "1" for all "normal" numbers.

As briefly mentioned above, a floating point number is considered to be normal when it falls within a range of values that would allow this standard representation, i.e. the most significant bit of the mantissa is "1" and the floating point number can be represented in the format: $1.m_1m_2 \ldots m_{23}*2^e$, where $m_1m_2, \ldots, m_{23}$ are bits of the mantissa. In other words, if the binary representation of a single precision floating point number is less than the value $1*2^{-126}$, then the most significant bit can no longer be "1" in single precision, and the floating number would have to take on the format: $0.m_1m_2 \ldots m_{23}*2^e$. These are called subnormal numbers. As can be seen, subnormal numbers suffer from loss of precision.

Coming now to conventional floating point multiplication of floating point operands, multiplier Rs and multiplicand Rt, to obtain floating point product Rm, the process proceeds as follows. A fixed point multiplication of mantissas of Rs and Rt generates the mantissa Mm of product Rm. A fixed point addition of the exponents of Rs and Rt while taking into account the bias (i.e. Es+Et−bias) generates the exponent Em of the product Rm. The sign of the product will be decided by the signs of Rs and Rt (if one and no more than one of Rs and Rt is negative, then the product Rm is negative, and otherwise the product Rm is positive). Further, the product Rm will have to be normalized, and this may require an additional step to scale the exponent appropriately and shift the mantissa accordingly to bring the product to a normal format. When it comes to adding or subtracting the addend operand Rx to the product Rm, the exponents of Rm and Rx may need to be aligned first, before adding/subtracting the operand Rx to the product Rm to complete the FMA operation to obtain result Rd=[(Rs*Rt)±Rx]=Rm±Rx. Conventionally, the result Rd may need to be normalized and appropriately rounded after applying the scaling factor $2^N$ to complete the FMASc operation. IEEE 754 defines various rounding modes which will not be described in detail herein. However, it will be recognized that given the finite number of bits available for storing the floating point numbers, rounding may result in a loss of precision. This loss of precision can be cumulative as intermediate results may be subjected to more than one stage of rounding in conventional implementations.

With reference now to FIG. 2, exemplary embodiments will be described to efficiently handle the above drawbacks associated with the normalization and rounding modes of conventional implementations. Floating point unit 200 is illustrated for executing an FMASc instruction according to exemplary embodiments. In some embodiments, exemplary hardware blocks 230-234 for scaling operation may be efficiently integrated with hardware blocks 202-228 for FMA operation. Floating point unit 200 is illustrated as staged across several stages using pipeline registers 236 and 238. Pipelined staging as illustrated may be utilized for reducing clock cycle time and thus increasing the frequency of operation of floating point unit 200. However, it will be understood that a staged pipeline is not necessary and exemplary embodiments may be implemented with combinational logic in a single stage.

Logic blocks 202-228 may be implemented without significant deviation from conventional techniques for FMA operations. As shown in block 202, floating point operands multiplier Rs and multiplicand Rt may be received from a register file ("RF", not illustrated). Multiplier Rs and multiplicand Rt may be represented in single-precision IEEE 754 format. Logic in block 204 may be configured to extract components of these operands, such as the sign, mantissa, and exponent respectively.

Block 206 comprises logic for multiplying the mantissas of Rs and Rt. The multiplication logic may incorporate the Booth multiplication algorithm which will not be described in detail herein. Accordingly, block 206 may involve a block for performing Booth encoding of multiplier Rs based on multiplicand Rt, which can be used to generate partial products that are subjected to one or more stages of compression/reduction in order to generate an intermediate result in a redundant format, represented as a sum and a carry value (not explicitly illustrated). A final adder, comprising for example, a carry-propagate adder, would be required to resolve this intermediate result (i.e. add the sum and carry values) to obtain the product Rm. However, in order to save expensive hardware for this final adder, the final adder is moved further down the logical path to adder block 220, such that a single adder may be used both for resolving the intermediate result, as well as adding/subtracting the addend Rx (after compression by 3:2 compression block 216) to obtain Rd=[(Rs*Rt)±Rx]. Accordingly the intermediate result in redundant format from block 206 may enter block 216 for 3:2 compression. The other input for 3:2 compression block 216 may arrive from block 214, which will be described in the following sections. It will be understood that while the discussion herein refers to adders, one of skill in the art will recognize how to perform addition or subtraction by suitably configuring hardware for adders. Thus, while the discussion may refer to illustrative embodiments for adding the addend operand, it will be understood that exemplary FMA/FMASc operations can be easily extended to subtraction of the addend operand Rx from the product Rs*Rt. Accordingly, references to accumulation of addend Rx may relate to addition or subtraction of addend Rx. The following sections will include specific cases where implementations of FMASc operation may diverge in their behavior, based on whether the accumulation relates to addition or subtraction of addend Rx.

Returning to FIG. 2, in parallel to multiplication of the mantissas of Rs and Rt, block 208 may compute the exponent of the product Rm. As previously noted, the exponent of the product Rm may effectively be obtained by the addition of the exponent Es of Rs and the exponent Et of Rt. However, it will be recalled that the exponents Es and Et may be represented in a biased format. Therefore, in order to retain the same format for the exponent of product Rm (hereinafter, "Em"), block 208 may add the exponents and subtract the bias (decimal value 127 for single-precision) from the sum of the exponents Es and Et to obtain the exponent Em (i.e. Em=Es+Et−bias). This value of Em will be used for aligning Rm with the addend Rx to perform the EMA computation.

In block 209, addend Rx can be obtained from the RF. In the illustrated embodiment, obtaining Rx from the RF and obtaining Rs and Rt from the RF are shown to be separated by pipeline stage 236. By staggering the reading of the operands across two pipeline stages in this manner, read ports of the RE may be reused. Thus, RF may comprise only two read ports, such that in a first pipeline stage (preceding pipeline register 236), Rs and Rt may be read out, and in the following pipeline stage, Rx may be read out from one of the two ports that were used to read out Rs and Rt. In some embodiments, the operands Rs, Rt, and Rx need not be obtained from the RF, and it is also possible to receive one or more of these operands from another source, such as memory or a different functional unit. Regardless of how the RF and pipeline staging is implemented and regardless of the manner in which the operands Rs, Rt, and Rx are received, block 210 can extract components of Rx, such as its sign, exponent Ex, and mantissa Mx.

As mentioned previously, Rx will have to be aligned with Rm before Rx can be added to Rm to form the output Rd of the FMA. Accordingly block 212 can receive as inputs, Em computed at block 208 and Ex obtained at block 210. The absolute value of the difference between Ex and Em (|Ex−Em|) will determine the details of the process of alignment that will be followed in block 214. Several cases arise based on the value of |Ex−Em|, which will be described in detail in the following sections. In all of these cases, a dual path design will be followed for the FMA operation, wherein the result of the FMA operation with scaling (or FMASc operation) will be computed in two parts—a high part with more significant bits, in parallel with a low part with less significant bits. In this manner, embodiments may expedite the computation process.

An exemplary format for an FMASc instruction may be of the form Rd=Round(Scale[Rx±Rs*Rt, N], rounding_mode. Accordingly, based on the operand N, a scaling value of $2^N$ can be incorporated in the above dual path FMA frame work. In one embodiment, N can be an 8-bit value such that the scaling value is in the range [−128, 127]. As previously noted, negative values of N can be referred to as scaling down the result Rd of the FMA operation and positive values of N can be referred to as scaling up the result Rd. Rounding modes can be applied as will be discussed in embodiments below.

As previously discussed, conventional implementations of the FMASc operation can result in loss of precision after exponent scaling, in cases where the result Rd overflows or is subnormal, or as described in the extreme cases such as colossal cancellation, below subnormal. In order to avoid the loss of precision, embodiments may recognize certain input operands of the FMASc operation which can cause problems ahead of time. Thus, embodiments may pre-align the intermediate results and addend operand before the adder block 220 is entered, and before normalization block 224 and rounding block 226 manipulate the output of the adder block 220. Accordingly, embodiments may ensure that rounding does not take place before the scaling operation is logically complete. One way to ensure this would be to widen normalization block 224 and rounding block 226 to theoretically retain the result of the FMA operation with infinite precision before scaling is performed. However, to achieve the same effect logically, leading zero counter (LZC) block 230 may be provided. The cooperation of blocks 230-236 with the above-described dual path FMA frame work is described below.

A basic framework for the dual path FMA will first be provided and functionality of blocks 230-234 related to the scaling operation will then be integrated into the description. These blocks 230-234 can be configured to incorporate the scaling factor as a pre-alignment shift amount for Rx based on relative values of Ex and Em as will be discussed in the following cases. In this manner, an implementation based on staging the FIVIA followed by scaling may be avoided in exemplary embodiments.

As noted previously, the absolute value of the difference between Ex and Em (|Ex−Em|) will control the operation of the dual path FMA in exemplary embodiments. Various cases based on particular values of (|Ex−Em|) have been illustrated in FIGS. 3-6. In general, the mantissa of Rx (Mx) may be split into a high part (hereinafter, "HMx") and a low part (hereinafter, "LMx"). The mantissa of FMA result Rd (hereinafter "Md") may be computed in two parts, wherein a low part (hereinafter "LMd") is computed, and a carry-over (as in a carry propagate addition) from the LMd may respectively increments a high part of the mantissa of Rd (hereinafter "HMd"). (It will be understood that the FMA with subtraction of Rx (i.e., Rm−Rx) is similar, and the general principles discussed with regard to FMA wherein Rx is added to Rm (i.e. Rm+Rx) can be extended with minor modifications as needed. For example, instead of a carry-over, a borrow may be used to decrement, instead of increment, HMx in the case of subtraction). In exemplary embodiments, an "add part" of the dual path FMA can refer to the computation of LMd, and an "incrementer part" can refer to the computation of HMd.

With reference now to FIG. 3, the dual path FMA without a scaling component integrated is first explained. FIG. 3 illustrates a table, Table 1 corresponding to a first case of exemplary dual path FMA implementation, wherein the difference between Ex and Em is in the range of 3. It will be understood that the constant "3" is employed in exemplary embodiments it shall not be construed as a limitation. In some embodiments, any suitable value, greater than 2, may be used. The computation of the incrementer part and the add part will be described for these cases in Table 1.

With reference to the first row 302, the case where Ex−Em>3 and the FMA relates to addition or subtraction of Rx is illustrated. In this case, the add part (LMd) is computed and a carry-over from the add part may be used to increment the incrementer part (HMx) as necessary. In one implementation, both HMx and HMx+1 are computed and the carry is used to select the correct value of HMd. Also shown in the table, is the shift amount which may be required for alignment/normalization of the output. In this case, LMd is right shifted by an amount which is logically defined as the distance between the location of Rx and Rm, i.e. Ex−Em. Once normalized, the normalized LMd (hereinafter "NLMd") may be concatenated with HMd in order to form Md. Rounding may be performed after HMd and LMd are concatenated to form Md. In row 304, the case where Ex and Em satisfy the condition, Ex−Em=3, and the FMA relates to addition of Rx is illustrated. This case is similar to the above-described case in row 302, and a carry-over is possible from LMd, which may result in an increment to be applied to HMd.

With reference to 306 the scenario where Ex and Em satisfy the condition Ex−Em<3 and the FMA relates to addition or subtraction of Rx is illustrated. In this case, the incrementer part, HMx is effectively of value "0" and therefore all of Md is generated from the add part, LMx. There is the possibility that (Mm±LMx) can experience massive cancellation. Accordingly a leading zero anticipation unit (LZA) in block 222 of FIG. 2 is provided in parallel with the adder in block 220 (to add Mm and LMx) in order to compute the shift amount for LMd. The resultant value of (Mm±LMx) may then normalized (i.e. left shifted) using the shift amount derived from the LZA in block 222. Rounding may be performed thereafter on the resultant Md.

In sub case 306a, a scenario requiring special considerations is illustrated. In this case, the condition Ex−Em<3 is satisfied, and further, max (Ex, Em)≤47 and the FMA relates to subtraction of Rx. When these conditions are met, it is likely that the final result Md may be subnormal. If the final result Md is subnormal, this condition may be flagged and the left shift amount for LMd may be capped, with the capping value selected as the value of max(Ex, Em)−1.

With reference to subcase 306b, yet another scenario requiring special considerations is illustrated. In this scenario, Md is unaligned, which would indicate that one and only one of Rs and Rt is a subnormal value. In this situation a shift amount for LMd of a value greater than the number of bits of the mantissa (24 for single-precision) may be required. Accordingly, the normalization process may incur a left shift of up to 2*24−1 or 47 bits. A left shift amount greater than the number of bits of the mantissa is referred to as a colossal cancellation, because all of the bits which hold relevant data will get shifted out. Colossal cancellation can occur when the value of Ex−Em is greater than or equal to −24. If Ex−Em=−24 and colossal cancellation were to occur, an extra guard bit may be required for storing a bit value of LMx to the right of the least significant bit (LSB) during normalization. On the other hand, if Ex−Em<−24, then colossal cancellation cannot occur because the first non-zero bit of Mm is guaranteed to be located at bit 23 of Mm or higher (i.e. more significant), for the unaligned result. It will be recognized that this scenario is similar to the scenario related to capping the shift amount at the value of max (Ex, Em)−1, as described with regard to row 306a.

In row 308, the case where Ex and Em satisfy the condition Ex−Em=3, and the FMA relates to subtraction of Rx, is illustrated. This scenario is similar to row 306, but a carry-out will not occur, and the result can be obtained from LW.

Coming now to FIG. 4, exemplary implementations of the dual path FMA with a scaling factor $2^N$ (FMASc), wherein the condition Ex−Em≥26 is satisfied, are illustrated. More particularly, with reference to Table 2 of FIG. 4, three scenarios of FMASc operation are illustrated. Case 402 relates to a scenario corresponding to N being a positive value (i.e. the FMASc relates to scaling up) and Rx is normal. This case substantially corresponds to FMA operations without scaling as described in FIG. 3.

As per case 404, where N is positive, but Rx is subnormal, the incrementer part may need to be shifted left by an amount equal to the minimum value of the leading zeros of Rx and the value of N (i.e. left shift=min (LZC (Rx), N)), and the add part may need to be right shifted by 1−(Em+N). Referring back to FIG. 2, the value of LZC(Rx) can be provided by block 230. Correspondingly, the "add part" may need to be shifted right by an amount equal to Ex−Em−min(LZC(Rx, N)). The shifts/alignments for the add part may be performed in block 214 and for the incrementer part may be performed in block 234.

In the above case 404 a "gap" may arise between Rx and Rm due to the difference between Ex and Em during the left shift of the incrementer part. This gap is representatively shown in column "gap" of Table 2 for this case. In order to account for this gap, a value corresponding to the related FMA operation ("0" for addition of Rx and "1" for subtraction of Rx) can be inserted into the LSB of the increment part. The add part may remain contribute to the final rounding. The add part can be right shifted by the value, Ex−Em−min(LZC (Rx, N)), before merging/concatenating with the incrementer part.

In case 406, where N is negative (i.e. scaling down), the incrementer part of Mx is right-shifted by an amount equal to (1−(Ex+N)). In order to preserve bits which may be lost from the incrementer part, extra storage is provided for preserving bits such as a guard and a round bit. Similarly, a sticky bit may be provided for the add part.

Coming now to FIG. 5, particular cases in the implementation of exemplary FMASc implementation, wherein the condition Ex−Em=26−4 or 3 is satisfied, are illustrated in Table 3. In case 502, where Rx is normal and N is positive (i.e. scaling up), the operation substantially corresponds to that of the FMA operation, similar to case 402 of FIG. 4.

On the other hand, when Rx is subnormal, two sub cases, 504a and 504b are illustrated. With regard to sub case 504a, when Ex−Em−min(LZC(Rx, N))>3, or when Ex−Em−min (LZC(Rx, N))=3 and the FMASc operation relates to addition of Rx, the incrementer is shifted left by the value of min(LZC (Rx), N). The add part may be shifted right by the amount 1−Em−min(LZC(Rx), N). However, in sub case 504b, where one of the conditions, Ex−Em−min(LZC(Rx), N)<3, or Ex−Em−min(LZC(Rx), N)=3 and FMASc operation relates to subtraction of Rx, are satisfied, the incrementer part is zero, and thus, the entirety of the resultant Mx comes from the add Part. The decimal (or binary) point of Rm becomes the reference point and therefore the resulting add part is left shifted by the LZC(Rx) and the left shift is capped by the value (Em+N). It will be understood that in sub case 504*b*, Ex=1 because Rx is subnormal. Therefore block 230 for computing LZC (Rx) need not be relied on for computing the leading zeros. The LZA in block 222 may be used instead. Further, the value of N would be smaller than LZC(Rx). Correspondingly, the condition Em+N>−2 will be satisfied. Em+N may be negative because the add part can handle three extra bits in more significant positions than the binary point of Rm.

With reference now to case 506, where N is negative (i.e. scaling down) and the FMA operation relates to subtraction of the addend Rx from Rm, the incrementer part may be shifted right by the amount 1−(Ex+N) and the add part may also be right shifted but with the amount 1−(Em+T). Guard and sticky bits will need to be stored for this right shifting. This illustrates a corner case wherein the result Mx before rounding is zero, but the guard bit switches from "1" to "0" because of the borrow signal from the add part (corresponding to the subtraction of Rx) and all the bits shifted out of the incrementer part are zeros.

With reference now to FIG. 6, Table 4 relating to cases where the condition Ex−Em<3 (or Ex−Em=3 and the FMA defines Rx to be subtracted from Rm) are satisfied, is illustrated. In case 602, where N is positive (i.e. scaling up), it is seen that the operation substantially corresponds to that of FMA operations described with regard to FIG. 3. Additionally, the LZA of block 222 may be reused as previously described, instead of relying on the LLC of block 230. The reference point will be located at the binary point of Rm.

In sub case 604*a* relating to N being negative (i.e. scaling down) the add part is right shifted by an amount equal to 1−(Em+N) when either Em>Ex or when both conditions Em≥Ex and Em+N<−1 are satisfied. In sub case 604*b* also relating to N being negative, the add part is left shifted and capped at an amount equal to (Em+N) when the conditions Em≥Ex and Em+N=0/−1 are satisfied.

Exemplary embodiments may be designed to retain the least number of bits required in order to satisfy requirements for rounding in IEEE 754 for single precision. In the above described scenarios which satisfy the conditions Em>Ex−3 and the FMA relates to addition or subtraction of the addend Rx from Rm; or Em=Ex−3 and the FMA relates to subtraction of the addend Rx from Rm, the most significant bits before scaling may stay in the add part which allows easy manipulation of the exponents for both scaling up and scaling down, or of the mantissas in the case of scaling down, during the normalization and rounding operations. Accordingly, the framework for the dual path FMA may be sufficient for implementing FMASc in these cases.

Detailed implementation of the above equations and conditions and related shifting and normalization hardware will now be described for exemplary embodiments. The conditions of the above cases illustrated in FIGS. 3-6 are first summarized by the following simplified equations for the incrementer part and the add part which cover all of the above cases.

Figure 7:
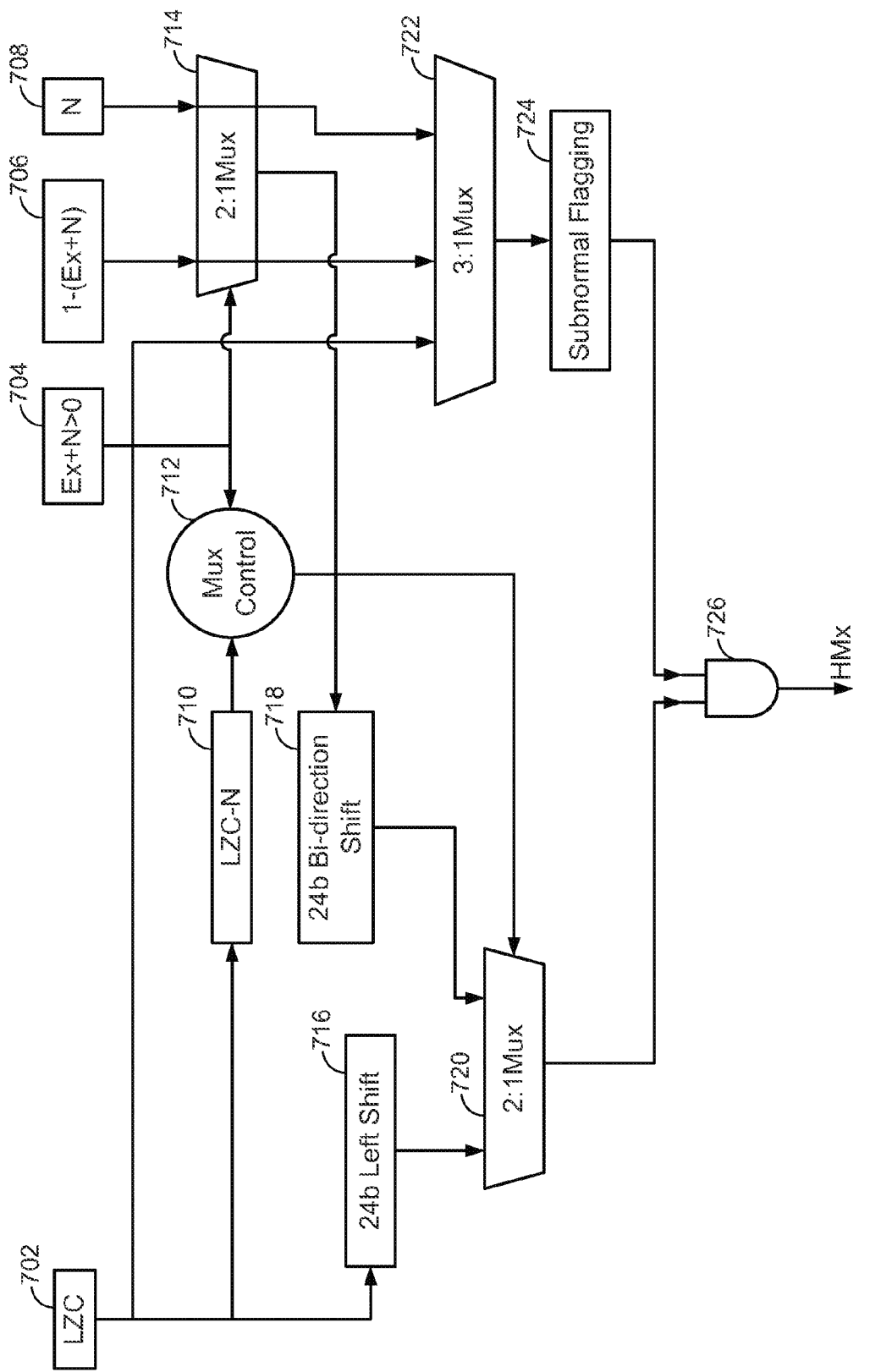
FIG. 7 illustrates an exemplary implementation of logic for obtaining the incrementer part of the addend operand in an exemplary FMASc implementation.

With reference to FIG. 7, an exemplary implementation of the shifting logic for the incrementer or HMx part is illustrated. For the incrementer/HMx part, if the condition Ex−Em>3 is satisfied (or if Ex−Em=3 is satisfied and the FMA relates to addition of the addend Rx to Rm), then the left shift amount for the incrementer may be determined by the value of min(LZC(Rx), N) and the right shift amount may be determined by the value of 1−(Ex+N). As shown, block 702 (or block 230 of FIG. 2) may be implemented to calculate the LZC(Rx). Block 704 may test the condition Ex+N>0, while block 706 may calculate the value of 1−(Ex+N). The value of N is stored in block 708, derived from the FMASc instruction. The values of min(LZC(Rx), N) and 1−(Ex+N) may be used to determine the shifting/masking on Mx as described above. In order to expedite the computation, embodiments may implement the two shifters illustrated in blocks 716 and 718 instead of waiting for the result of LZC(Rx) to become available from block 702. The shifter in block 716 may perform left shifts based on the value of LZC(Rx), while the shifter in block 718 may be implemented as a bi-directional shifter controlled by the output of multiplexor block 714, which can left shift Mx by the amount N or right shift Mx by the amount 1−(Ex+N). The decision of whether to shift left or right may be based on the condition Ex−Em>3 or Ex−Em=3 in the case where the FMA relates to one of addition or subtraction of the addend Rx. This decision may be implemented in multiplexor control block 712 and the appropriately shifted value can be selected by multiplexor block 720. In parallel, the output of multiplexor in block 722 can be used by subnormal flagging block 724 in order to determine if the final result will be subnormal, and flag this case, such that the shift amounts may be capped. The outputs of subnormal flagging block 724 and multiplexor block 720 can then be consolidated in logic block 726 to obtain the final value of HMx.

Figure 8:
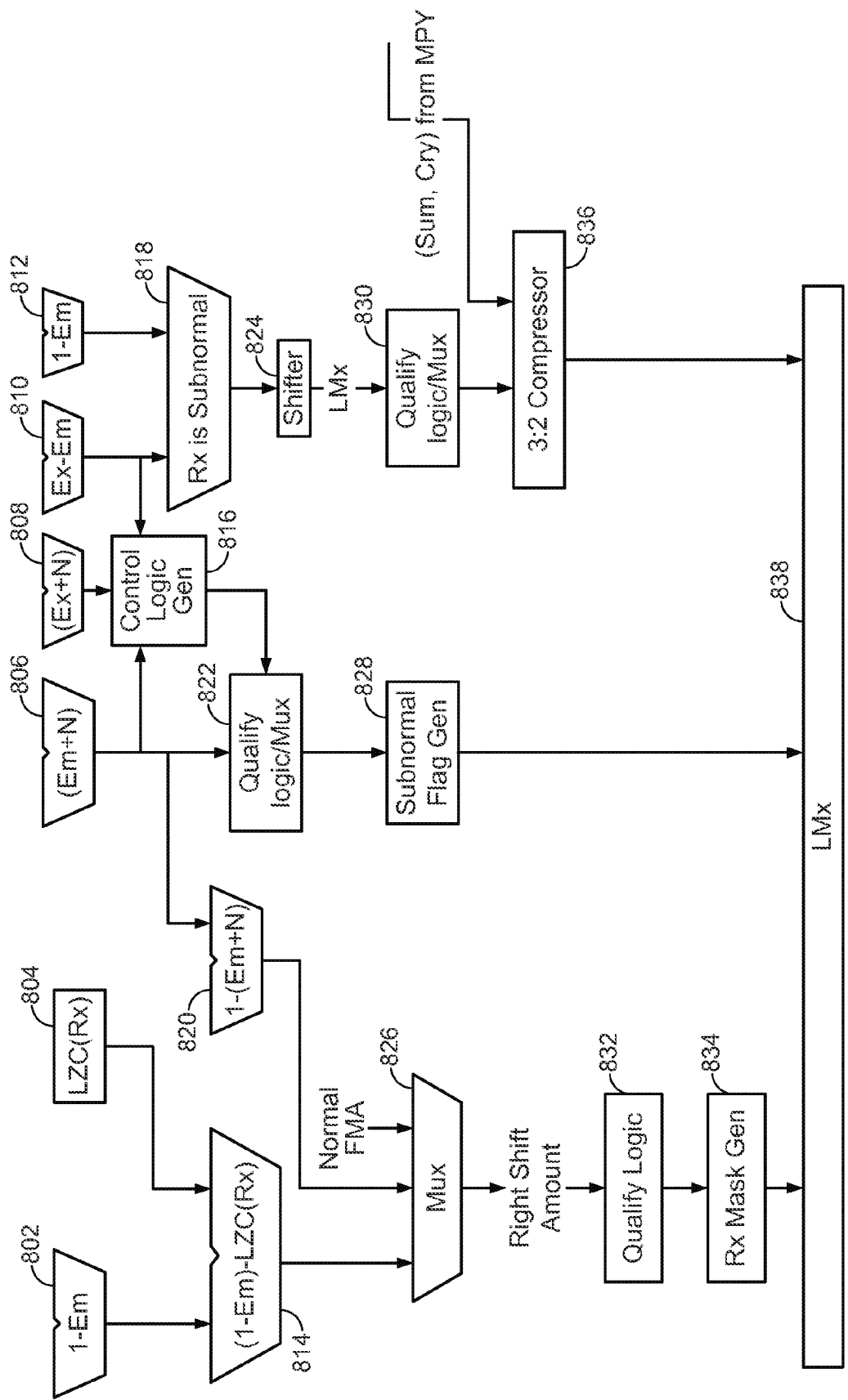
FIG. 8 illustrates an exemplary implementation of logic for obtaining the add part of the addend operand in an exemplary FMASc implementation.

With regard to the add part, the conditions are broken down into three main cases. Referring to FIG. 8, an exemplary implementation for the add part or LMx is illustrated. In a first case wherein the condition Ex−Em>3 is satisfied and the FMA relates to addition or subtraction of the addend Rx to Rm (or if Ex−Em=3 is satisfied and the FMA relates to addition of the addend Rx to Rm) then the right shift amount for the add part may be determined by the value of Ex−Em−min (LZC(Rx), N). This value is equal to 1−Em−LZC(Rx), or is equal to the 1−(Em+N), based on the value of min(LZC(Rx), N). Blocks 802-810, 814, and 820 may be used to evaluate the above conditions as illustrated. Multiplexor block 826 in conjunction with qualification and Rx masking logic in blocks 832 and 834 respectively may then calculate the final value for LMx in this case.

In a second case, wherein the condition 26≥Ex−Em>3 is satisfied, or if Ex−Em=3 is satisfied and the FMA relates to addition of the addend Rx to Rm, then the left shift amount for the add part may be determined by the value of (Em+N) which may be capped as described above based on the subnormal flag. In addition to some of the logic blocks for the first case, the second case may be implemented using the additional blocks 812, 818, and 816 may determine whether Rx is subnormal, and the qualifying logic in block 822 in conjunction with subnormal flag generation block 828 may then flag the result as subnormal.

In a final case, wherein the condition Ex−Em<3 is satisfied and the FMA relates to addition or subtraction of the addend Rx to Rm (or if Ex−Em=3 is satisfied and the FMA relates to subtraction of the addend Rx to Rm) the right shift amount for the add part may be determined by the value of 1−(Ex+N) and the left shift amount may once again be determined by the value of (Em+N) which may be capped as described above based on the subnormal flag. Shifter logic in block 824, qualifying logic in block 830 and the 3:2 compressor in block 836 may be used to determine the final result for LMx in block 838.

As a summarization of the foregoing sections, exemplary embodiments may integrate the scaling operation within the dual path FMA pipeline by determining the cases where overflow/underflow may occur for the FMA operation based on the various exponent values Ex and Em and prealigning Rx. LMx and HMx are determined by taking into account the leading zeros of Rx and accounting for the scaling factor $2^N$, such that LMx and HMx already include the scaling factor applied to them before the final value Rd is computed for the FMASc operation. The lower part, LMx is added along with the product Rm (=Rs*Rt) by using a 3:2 compression before the final product Rm is resolved. A carry over/borrow from the result of the addition is used to increment/decrement HMx. Normalization is performed based on LMx and the number of leading zeros therein. IEEE compliant rounding is delayed until the last stage after the result Rd is obtained, such that here is no loss of bits/precision in the intermediate stages.

Figure 9:
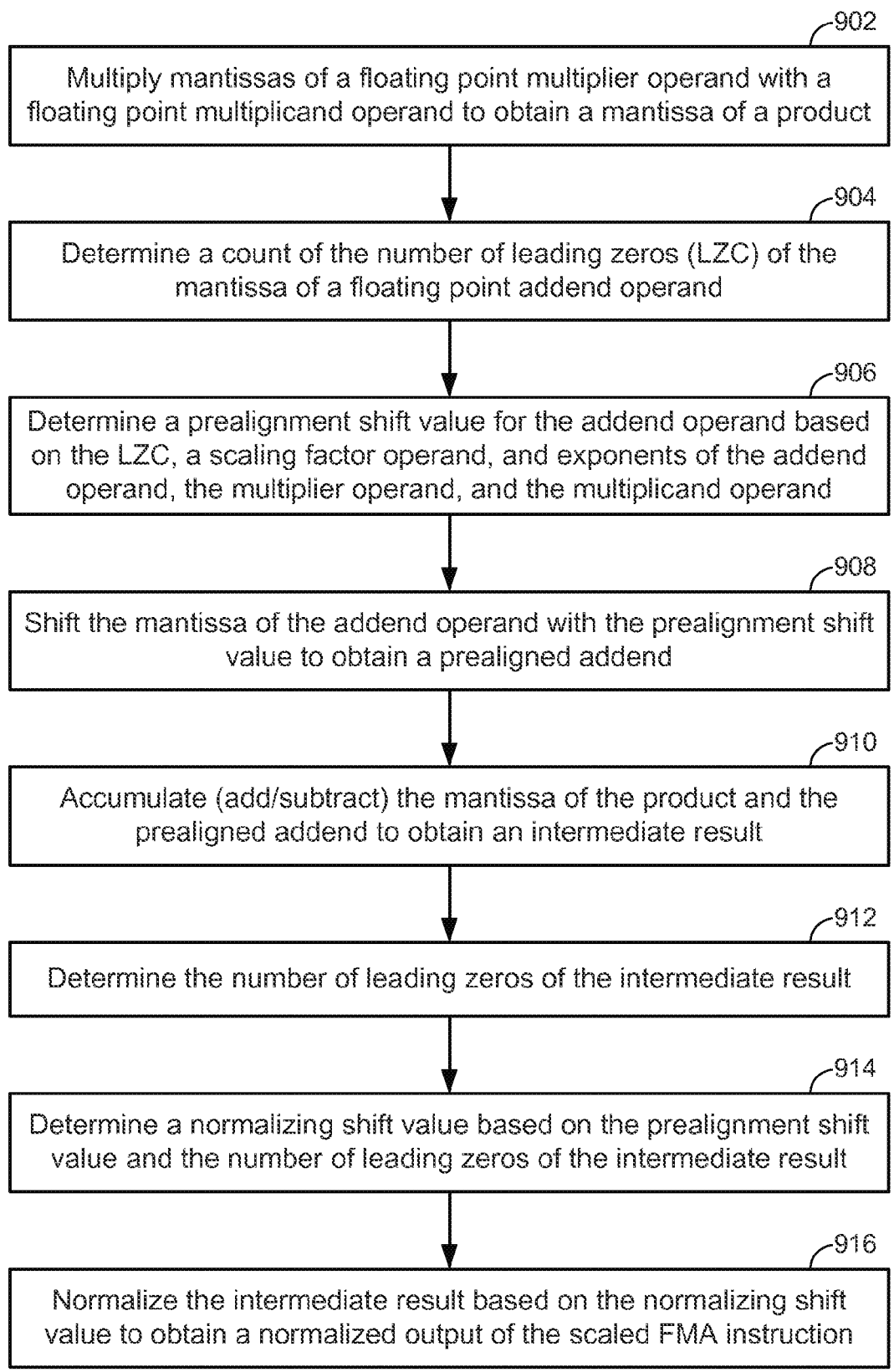
FIG. 9 illustrates a flow chart depiction of an exemplary operational flow for implementing a FMASc operation.

It will be appreciated that embodiments include various methods for performing the processes, functions and/or algorithms disclosed herein. For example, as illustrated in FIG. 9, an embodiment can include a method of implementing a floating point scaled fused multiply and add (FMA) operation (see, e.g., FIG. 2), the method comprising: multiplying mantissas of a floating point multiplier operand (e.g. Rs) with a floating point multiplicand operand (e.g. Rt) to obtain a mantissa of a product—Block 902; determining a count of the number of leading zeros (LZC) (e.g. block 230 of FIG. 2) of the mantissa of a floating point addend operand (e.g. Rx)—Block 904; determining a pre-alignment shift value (e.g. in block 234 of FIG. 2) for the addend operand based on the LZC, a scaling factor operand (e.g. N), and exponents of the addend operand (e.g. Ex), the multiplier operand (e.g. Et), and the multiplicand operand (e.g. Es)—Block 906; shifting the mantissa of the addend operand with the pre-alignment shift value to obtain a pre-aligned addend (e.g. blocks 214 and 218 of FIG. 2 for LMx and HMx calculations)—Block 908; accumulating (adding/subtracting) the mantissa of the product and the pre-aligned addend (e.g. in adder 220 of FIG. 2) to obtain an intermediate result—Block 910; determining the number of leading zeros (e.g. in block 222 of FIG. 2) of the intermediate result—Block 912; determining a normalizing shift value based on the pre-alignment shift value and the number of leading zeros of the intermediate result—Block 911; and normalizing the intermediate result (e.g. in block 224 of FIG. 2) based on the normalizing shift value to obtain a normalized output of the scaled FMA instruction—Block 916.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Figure 10:
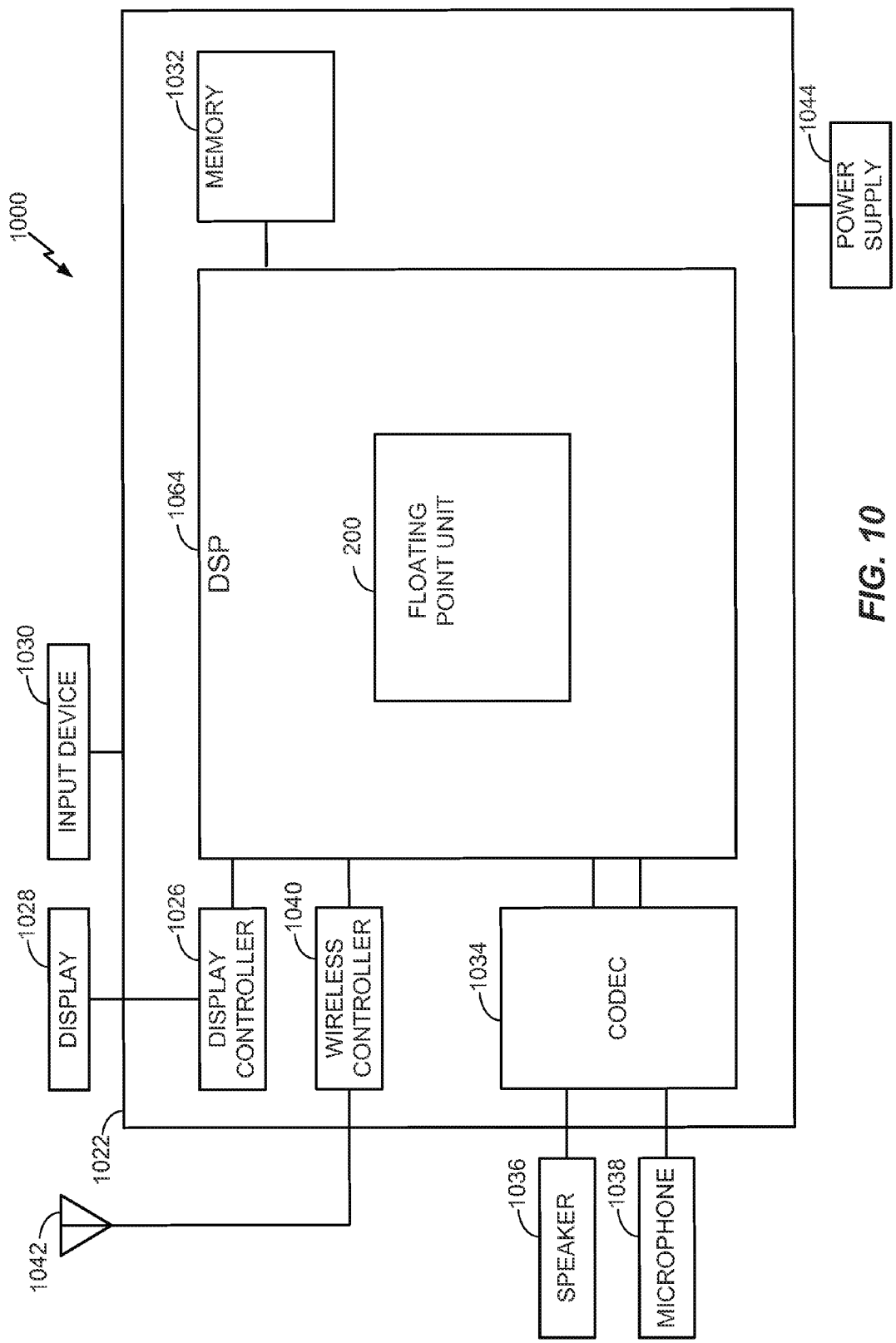
FIG. 10 illustrates an exemplary wireless communication system 1000 in which an embodiment of the disclosure may be advantageously employed.

Referring to FIG. 10, a block diagram of a particular illustrative embodiment of a wireless device that includes a multi-core processor configured according to exemplary embodiments is depicted and generally designated 1000. The device 1000 includes a digital signal processor (DSP) 1064 which may include floating point unit 200 discussed above with regard to exemplary embodiments. DSP 1064 may be coupled to memory 1032. FIG. 10 also shows display controller 1026 that is coupled to DSP 1064 and to display 1028. Coder/decoder (CODEC) 1034 (e.g., an audio and/or voice CODEC) can be coupled to DSP 1064. Other components, such as wireless controller 1040 (which may include a modem) are also illustrated. Speaker 1036 and microphone 1038 can be coupled to CODEC 1034. FIG. 10 also indicates that wireless controller 1040 can be coupled to wireless antenna 1042. In a particular embodiment. DSP 1064, display controller 1026, memory 1032, CODEC 1034, and wireless controller 1040 are included in a system-in-package or system-on-chip device 1022.

In a particular embodiment, input device 1030 and power supply 1044 are coupled to the system-on-chip device 1022. Moreover, in a particular embodiment, as illustrated in FIG. 10, display 1028, input device 1030, speaker 1036, microphone 1038, wireless antenna 1042, and power supply 1044 are external to the system-on-chip device 1022. However, each of display 1028, input device 1030, speaker 1036, microphone 1038, wireless antenna 1042, and power supply 1044 can be coupled to a component of the system-on-chip device 1022, such as an interface or a controller.

It should be noted that although FIG. 10 depicts a wireless communications device. DSP 1064 and memory 1032 may also be integrated into a set-top box, a music player, a video player, an entertainment unit, a navigation device, a personal digital assistant (PDA), a fixed location data unit, or a computer. A processor DSP 1064) may also be integrated into such a device.

Accordingly, an embodiment of the invention can include a computer readable media embodying a method for implementing a floating point fused multiply and add with scaling (FMASc) operation. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of implementing a floating point scaled fused multiply and accumulate (FMASc) operation in a floating point unit, the method comprising:
   multiplying mantissas of a floating point multiplier operand with a floating point multiplicand operand in a multiplier block to obtain a mantissa of a product;
   determining a count of the number of leading zeros (LZC) of the mantissa of a floating point addend operand in a LZC block;
   determining a pre-alignment shift value for the floating point addend operand based on the LZC, a scaling factor operand, and exponents of the floating point addend operand, the floating point multiplier operand, and the floating point multiplicand operand in a pre-alignment block;
   shifting the mantissa of the floating point addend operand with the pre-alignment shift value to obtain a pre-aligned addend in an alignment block;
   accumulating the mantissa of the product and the pre-aligned addend to obtain an intermediate result in an accumulator block;
   determining the number of leading zeros of the intermediate result in a leading zero anticipator block;
   determining a normalizing shift value based on the pre-alignment shift value and the number of leading zeros of the intermediate result; and
   normalizing the intermediate result based on the normalizing shift value in a normalization block to obtain a normalized output of the FMASc operation.

2. The method of claim 1 further comprising rounding the normalized output with a rounding value based on the normalizing shift value.

3. The method of claim 2, wherein the normalizing shift value is one of a left shift or a right shift.

4. The method of claim 3, wherein the left shift is based on the number of leading zeros of the intermediate result or a function of exponents of the floating point addend operand, the floating point multiplier operand, and the floating point multiplicand operand.

5. The method of claim 3, wherein the right shift is based on a function of the scaling factor operand, and exponents of the floating point addend operand, the floating point multiplier operand, and the floating point multiplicand operand.

6. The method of claim 1, wherein the accumulating is one of an adding or subtracting, as specified by the FMASc operation.

7. A method of executing a floating point operation in a floating point unit, the method comprising:
   receiving multiplier, multiplicand, addend, and scaling factor operands in the floating point unit;
   performing a partial multiplication operation on mantissas of the multiplier and multiplicand operand in a multiplier block to obtain an intermediate product;
   pre-aligning a mantissa of the addend with the intermediate product based on the scaling factor and exponents of the addend, multiplier, and multiplicand in a pre-alignment block; and
   accumulating the mantissa of the pre-aligned addend and the intermediate product in an accumulator block to obtain the result of the floating point operation.

8. The method of claim 7, further comprising normalizing the result.

9. The method of claim 8, further comprising performing a rounding operation on the normalized result, wherein rounding is avoided in the method, before the normalized result is obtained.

10. The method of claim 7, wherein the accumulating is one of an adding or subtracting, as specified by the floating point operation.

11. A floating point unit comprising:
    input multiplier, multiplicand, addend, and scaling factor operands;
    a multiplier block configured to multiply mantissas of the multiplier and multiplicand to generate an intermediate product;
    alignment logic configured to pre-align the addend with the intermediate product based on the scaling factor and exponents of the addend, multiplier, and multiplicand; and
    accumulation logic configured to add or subtract a mantissa of the pre-aligned addend with the intermediate product to obtain a result of the floating point unit.

12. The floating point unit of claim 11, further comprising a normalization block configured to normalize the result.

13. The floating point unit of claim 12, further comprising a leading zero anticipator (LZA) block configured to anticipate the number of leading zeros in the result based on an intermediate result from the accumulation logic, such that the normalization is based on an output of the LZA block.

14. The floating point unit of claim 12, further comprising a rounding block configured to perform a specified rounding on the normalized result.

15. The floating point unit of claim 11, wherein the mantissa of the addend is divided into a high part and a low part, such that the alignment logic is configured to separately pre-align the low part and the high part, wherein the pre-aligned low part is used for addition with the intermediate product in the addition logic, and an incrementer logic is configured to increment or decrement the high part based on a carry or borrow value from the output of the addition logic.

16. The floating point unit of claim 11, wherein the multiplier block is configured as a Booth multiplier.

17. The floating point unit of claim 11, wherein the intermediate product is represented in a redundant format comprising a sum part and a carry part.

18. The floating point unit of claim 11, configured to execute a floating point fused multiply and add with scaling (FMASc) instruction.

19. The floating point unit of claim 11 integrated in at least one semiconductor die.

20. The floating point unit of claim 11 integrated into a device selected from the group consisting of a set top box, music player, video player, entertainment unit, navigation device, communications device, personal digital assistant (PDA), fixed location data unit, and a computer.

21. A processing system comprising:
    means for receiving floating point multiplier, multiplicand, addend, and scaling factor operands;
    multiplier means for multiplying mantissas of the multiplier and multiplicand to generate an intermediate product;
    alignment means for pre-aligning the addend with the intermediate product based on the scaling factor and exponents of the addend, multiplier, and multiplicand; and
    accumulation means for adding or subtracting a mantissa of the pre-aligned addend with the intermediate product to obtain a floating point result of the processing system.

22. The processing system of claim 21, further comprising a normalization means for normalizing the floating point result.

23. The processing system of claim 21, further comprising means for rounding the normalized floating point result based on a specified rounding mode.

24. The processing system of claim 21, configured to execute a floating point fused multiply and add with scaling (FMASc) instruction.

25. A method of performing a dual data path floating point fused multiply and accumulate operation with scaling (FMASc) operation in a floating point unit, the method comprising:

receiving multiplier, multiplicand, addend, and scaling factor operands in a multiplier block;

performing a partial multiplication operation on mantissas of the multiplier and multiplicand operand in the multiplier block to obtain an intermediate product;

separating the mantissa of the addend into a high addend part with more significant bits and a low addend part with less significant bits;

aligning the high addend part to form an incrementer part;

aligning the low addend part with the intermediate product;

accumulating the low addend part with the intermediate product in an accumulator block to form an add part;

incrementing or decrementing the incrementer part based on a carry out or borrow value respectively from the add part to form a final incrementer part; and concatenating the final incrementer part with the add part to form the result of the floating point operation.

26. The method of claim 25, wherein aligning the high and low addend parts are based on the value of the scaling factor, and a difference between exponents of the addend operand and the sum of the exponents of the multiplier and multiplicand operands.

27. The method of claim 26, wherein if the scaling factor is zero, left and right shift values for aligning the high and low addend parts are determined based on the difference between exponents of the addend operand and the sum of the exponents of the multiplier and multiplicand operands being one of greater than, equal to, or less than a first constant.

28. The method of claim 26, wherein if the scaling factor is not equal to zero, left and right shift values for aligning the high and low addend parts are determined based on the difference between exponents of the addend operand and the sum of the exponents of the multiplier and multiplicand operands being one of greater than, equal to, or less than a second constant.

29. The method of claim 26, wherein shift values for aligning the high and low addend parts where the accumulating specified in the FMASc operation relates to subtraction of the addend from the product of the multiplier and multiplicand operands are different from shift values for aligning the high and low addend parts where the accumulating specified in the FMASc operation relates to addition of the addend with the product of the multiplier and multiplicand operands.

* * * * *